United States Patent [19]

Reichenbach et al.

[11] Patent Number: 5,033,426
[45] Date of Patent: Jul. 23, 1991

[54] RADIAL COMBUSTION SEAL

[75] Inventors: Dean H. Reichenbach; Steven G. Barnes, both of Columbus, Ind.

[73] Assignee: Cummins Engine Company, Inc., Columbus, Ind.

[21] Appl. No.: 570,805

[22] Filed: Aug. 22, 1990

[51] Int. Cl.⁵ ............................................. F02F 1/00
[52] U.S. Cl. ........................ 123/193 CH; 123/193 C; 277/236; 277/168
[58] Field of Search ........ 123/193 CH, 193 C, 193 H; 277/235 B, 205, 236, 168

[56] References Cited

U.S. PATENT DOCUMENTS

| | | | |
|---|---|---|---|
| 2,972,341 | 2/1961 | Forst | 123/193 CH |
| 3,055,670 | 9/1962 | Sampson | 277/168 |
| 3,139,009 | 6/1964 | Harting | 123/193 CH |
| 3,209,659 | 10/1965 | Colwell | 123/193 C |
| 3,820,799 | 6/1974 | Abbes et al. | 277/236 |
| 3,937,201 | 2/1976 | Howe | 123/193 CH |
| 4,114,907 | 9/1978 | Abbes et al. | 277/231 |
| 4,399,783 | 8/1983 | Hauser, Jr. | 123/193 CH |

*Primary Examiner*—Andrew M. Dolinar
*Assistant Examiner*—M. Macy

*Attorney, Agent, or Firm*—John C. Evans

[57] ABSTRACT

A liner assembly for an internal combustion engine includes a liner bore in an engine block which receives a cylinder liner having an end extension which is received in an annular cylinder head groove. The end extension of the cylinder liner includes a outer circumferential surface thereon which is formed to define a very small gap with the outer circumferential surface of the cylinder head groove; the inner circumferential surface of the upper end is radially spaced from the inner circumferential surface of the cylinder head groove to form an annular seal space for a radial seal that is captured between the upper end and the cylinder head to form an active combustion gas seal between the cylinder liner and the cylinder head. The end surfaces of the upper end of the cylinder liner are spaced axially from the cylinder head when the cylinder head is clamped to seal a head gasket between the cylinder head and the cylinder block of the engine and the cylinder head reacts the seal forces to prevent moments on the cylinder liner whereby the cylinder liner remains undistorted so as to reduce oil consumption and to improve ring and liner wear.

14 Claims, 3 Drawing Sheets

5,033,426

RADIAL COMBUSTION SEAL

FIELD OF THE INVENTION

This invention relates to internal combustion engine liners and more particularly to interference fit cylinder liners which fit in a cylinder bore in a cylinder block having a cylinder head connected thereto for sealing a head gasket between the cylinder head and the cylinder block of high compression engines.

BACKGROUND OF THE INVENTION

The use of interference fit cylinder liners in internal combustion engines provides long engine life and reduce service requirements. Such liners, however, have certain drawbacks as presently fit and sealed within a counterbore of the engine block. In present arrangements, the cylinder head is clamped to the engine block for sealing a head gasket therebetween. A combustion gas seal for the cylinder liner is also clamped between the liner and the cylinder head to seal the combustion gases. In some cases the combustion seal is formed as part of the head gasket. Such arrangements require a high unit loading to effect a seal between the head gasket, the cylinder head and the engine block. Such loadings are transferred to the a cylinder liner flange supported on the cylinder block at a counterbore therein. The high unit loadings are concentrated through the liner flange into the block at the counterbore. Such load concentrations can cause the block to crack at the counterbores therein where the liner flanges engage the block.

An alternative approach has been to eliminate the cylinder block counterbores by providing a separate spacer plate on top of the cylinder block to distribute the cylinder head load into the cylinder block without concentrating the flange liner to cylinder block load on one part of the cylinder block. Such separate spacer plates are an additional cost and require special handling during assembly which further adds complexity and cost of cylinder liner arrangements for use in for high compression internal combustion engines.

Other alternative approaches have been to provide mid-stop or bottom stop surfaces on the cylinder block to receive either a mid flange or an end surface of a cylinder liner. Such arrangements provide more compliance in the liner to take up the high unit loadings when the cylinder head is clamped to the cylinder block. This alternative causes the cylinder block to be placed in tension which in the case of cast iron blocks in the weakest mode of load support.

In each of the aforesaid liner configurations, the cylinder liner is subjected to loadings and moments which will cause the inner surface of the liner to distort. Such distortion results in undesirable oil consumption, piston ring wear, and increased liner wear.

Another approach has been to provide a cylinder liner in which the liner is press fit into a counterbore in a cylinder head. Examples of such arrangements are set forth in U.S. Pat. Nos. 3,937,201 and 4,399,783. The '201 patent requires that the end of the cylinder liner and the cylinder counterbore be precisely dimensioned such that thermal expansion between the liner and cylinder head will effect a tight seal therebetween. The problem with the '201 arrangement is that no combustion gas seal is formed until the engine is thermally expanded. Additionally, once thermally expanded distortion loads are placed on the cylinder liner. The '783 patent is arranged to produce a radial interference fit between the end of the liner and the surfaces of a counterbore in the cylinder head. As assembled the liner of the '783 patent will be distorted at the top of the liner as much or more than the earlier referenced liner assemblies set forth above.

The cylinder liner of the present invention provides for combustion gas sealing in high compression engines and in particular it provides for sealing of combustion gas in high compression diesel engines without distorting the liner and without overloading the cylinder block of the engine to produce undesirable cracks therein.

SUMMARY OF THE INVENTION

More specifically, the present invention includes a radial combustion gas seal assembly for a cylinder liner in a high compression internal combustion engine. A feature of the invention is that the radial combustion gas seal assembly is easily assembled and produces a resultant high performance seal of combustion gases without imposing high unit loadings on either the liner or the cylinder block at support surfaces thereon which support the liner within the cylinder block.

A general object of the present invention is to provide a combustion gas seal between the cylinder liner of a high compression internal combustion engine and the cylinder head by a combustion gas seal assembly which will limit or totally remove all bending moments on the cylinder liner.

A further object of the present invention is to provide a combustion gas seal assembly between the cylinder liner and cylinder head which does not require cylinder head capscrews for producing a combustion gas seal between the cylinder liner and the cylinder head whereby simplified capscrew designs can be utilized to provide head gasket sealing between the cylinder block and cylinder head of the engine.

A feature of the present invention is the provision of an active combustion gas seal located radially of the inner circumferential surface of the end of a cylinder liner and the inner circumferential surface of an annular seating and sealing groove in a cylinder head and wherein a clearance gap is provided between the outer circumferential surface of the end of the cylinder liner and the reactive support surface on either the cylinder head or the cylinder block to prevent the imposition of a moment on the cylinder liner which will distort the liner during engine operation and to further provide an axial clearance gap between the cylinder head and the end surfaces of the cylinder liner thereby to prevent axial forces from being applied to the cylinder liner during engine operation.

Still another feature of the present invention is to provide for such an active combustion gas seal which has a wire ring with opposed inner and outer annular surfaces respectively sealingly engaging the inner circumferential surface of the seating and sealing groove and the inner circumferential surface of the end of the cylinder liner.

Still another feature is to provide a taper on the inner circumferential surface of the seating and sealing groove which will impose a radial sealing force on the active sealing element during assembly of the cylinder head on the engine block for sealing a head gasket therebetween.

Still further features of the present invention is to provide such an active sealing element in the form of a gas energized C-ring.

Other features, objects and advantages of the present invention will be more apparent to one skilled in the art when considering the accompanying detailed description of the invention as read in conjunction with the accompanying drawings.

BRIEF DESCRIPTION OF THE INVENTION

DETAILED DESCRIPTION OF THE INVENTION

Figure 1:
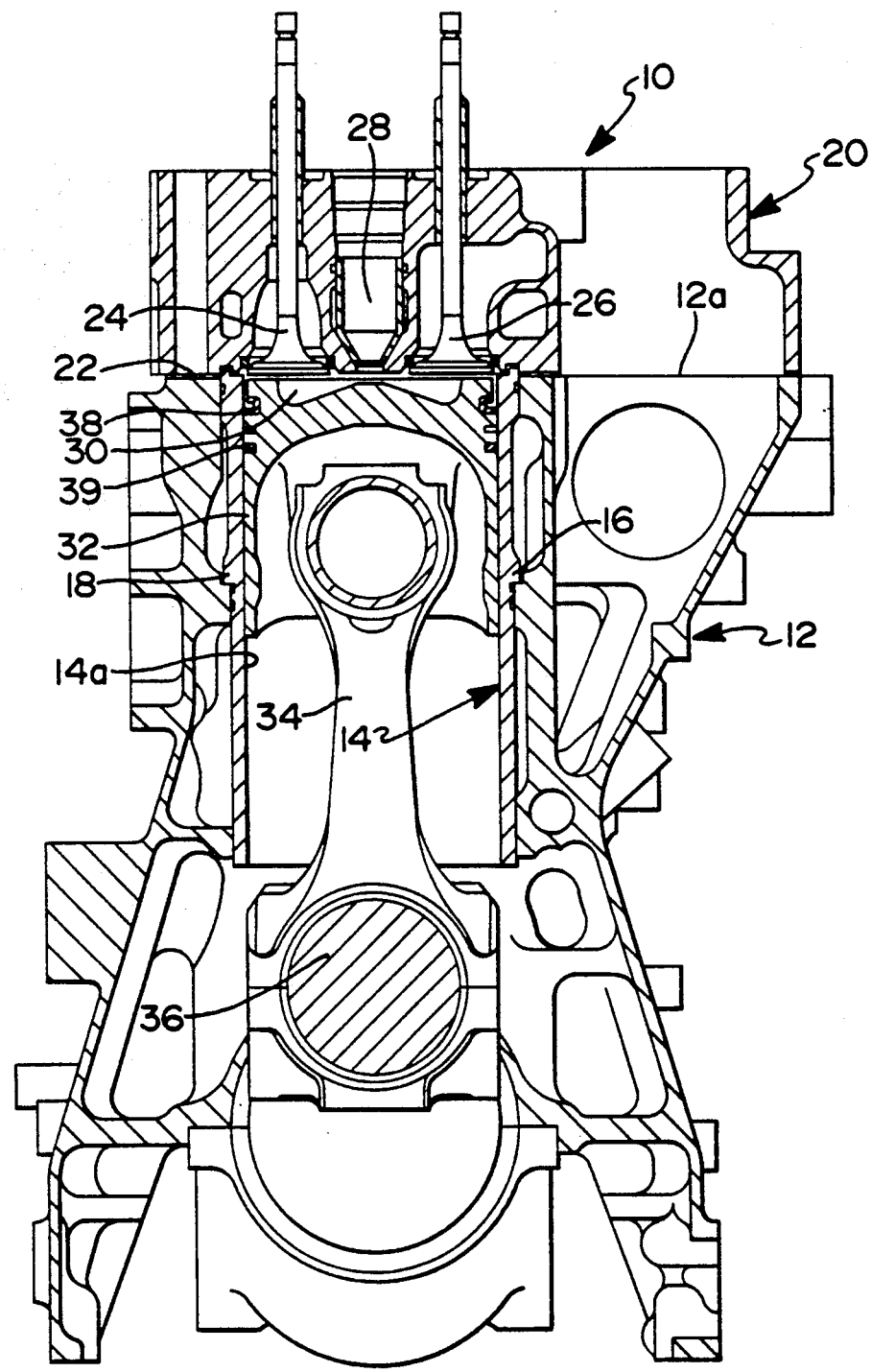
FIG. 1 is a sectional view of a high compression diesel engine showing an interference fit cylinder liner having the radial combustion gas seal of the present invention.
Figure 2:
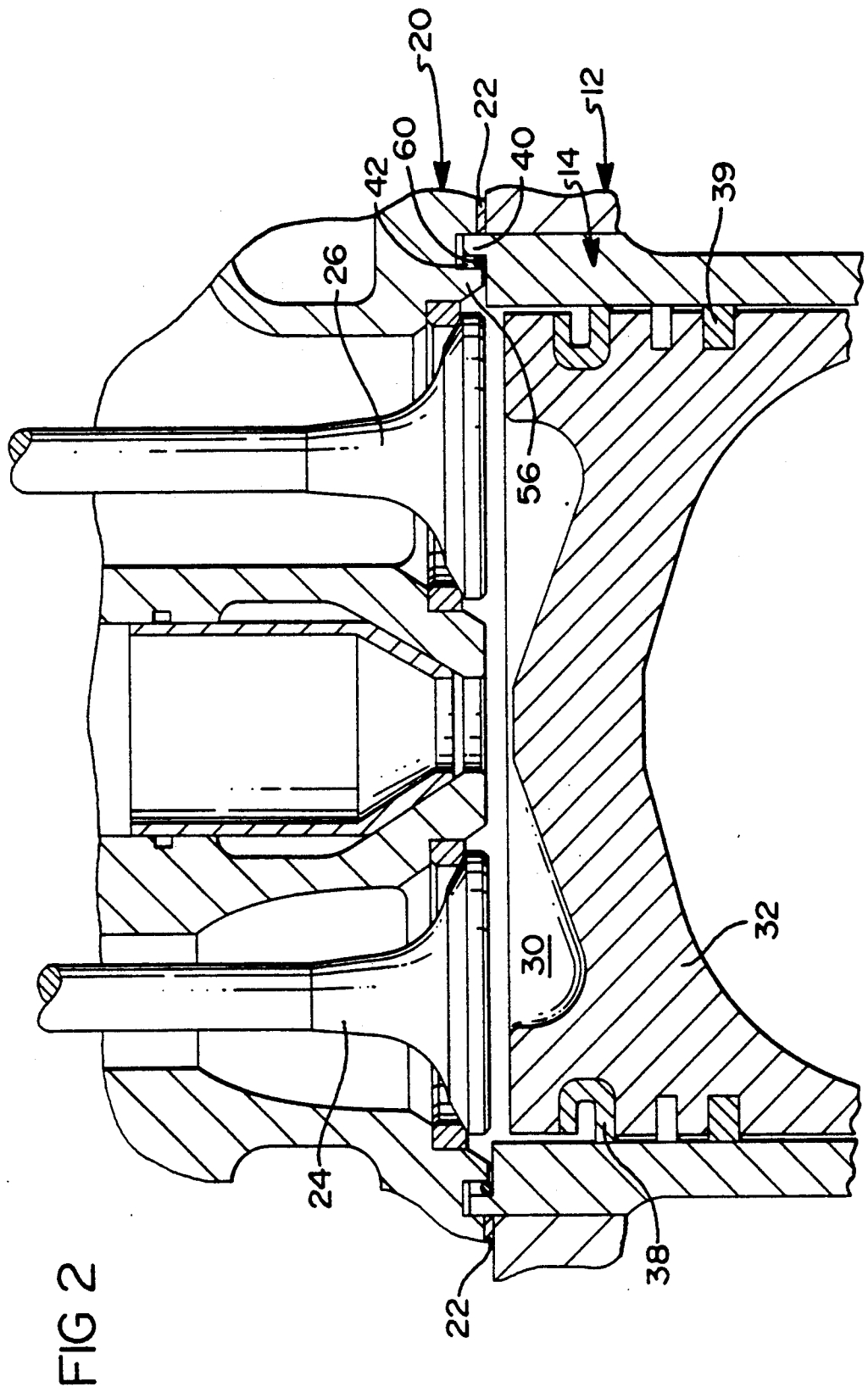
FIG. 2 is an enlarged, fragmentary sectional view of the upper end of the cylinder liner shown in FIG. 1.
Figure 3:
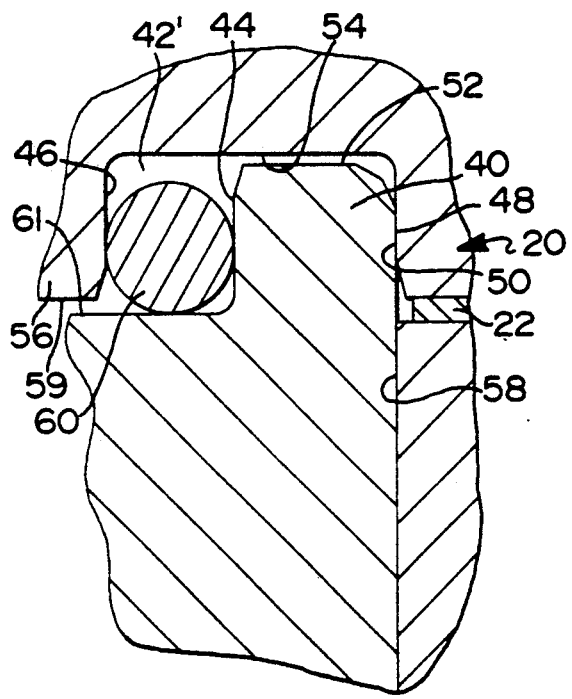
FIG. 3 is an enlarged, fragmentary sectional view of the active components of the radial combustion gas seal in FIGS. 1 and 2.

Referring now to FIG. 1, a high compression internal combustion engine 10 is shown. The engine 10, more specifically is representatively shown as a high compression diesel engine. It should be understood that while discussed with respect to a diesel engine that the invention is equally suitable for use in other types of internal combustion engine wherein it is desirable to prevent leakage of combustion gases into other parts of the engine.

The engine 10 includes a cylinder block 12 having a loose fit cylinder liner 14 positioned therein. In the illustrated arrangement the cylinder block 12 includes a counterbore 16 thereon that supportingly receives a mid-point flange 18 on the liner 14 for holding the cylinder liner 14 vertically positioned and referenced with respect to the upper surface 12a of the cylinder block 12. A cylinder head 20 and head gasket 22 are included on the cylinder block 12 and the cylinder head 20 is fastened to the cylinder block 12 by known cylinder head capscrews (not shown) to provide an axial load between the cylinder block 12, head gasket 22 and cylinder head 20 to seal engine coolant and to seal exhaust gases and intake charges.

The engine includes conventional intake and exhaust valves 24, 26 and a fuel injector (not shown) is supported in a bore 28 in the cylinder head 20. The fuel injector is of a known type which will be controlled to direct fuel into a combustion bowl 30 of a reciprocating piston 32.

The reciprocating piston 32 is connected by a piston rod 34 to a crankshaft 36. Piston rings 38, 39 are provided to seal between the piston 32 and the inner surface 14a of the liner 14 during engine operation. The piston rings 38, 39 seal in the combustion gases and the compression pressures generated when diesel fuel is injected into the combustion bowl for self-ignition therein at the end of the compression ignition stroke. Furthermore, the interface between the inner surface 14a and the piston rings 38, 39 prevents the leakage of crankcase oil into the combustion chamber during engine operation.

In the past cylinder liners have been mounted such that axial forces or force moments were directed thereagainst to cause the liner to distort along its length. Such distortion resulted in several problems including excessive piston ring wear, excessive oil consumption and excessive liner wear.

Accordingly, the liner 14 of the present invention has been modified so as to eliminate or substantially reduce forces on the liner 14 which would otherwise distort the liner during engine operation.

More particularly, the liner 14 has an end extension 40 thereon which fits within a seating and sealing groove 42 in the cylinder head 20. The end extension 40 has an inner circumferential surface 44 which is radially spaced from the inner circumferential surface 46 of the groove 42. The radially outer circumferential surface 48 of the end extension 40 forms a close clearance gap with the radially outer circumferential surface 50 of the groove 42. In one embodiment the gap is in the order of 0.0005 inches so that the end extension 40 will fit snugly in the radial direction within the groove 42. The end extension 40 also has a first end surface 52 thereon which is spaced axially of the bottom surface 54 of the groove 42 a distance which will enable the cylinder head 20 to be tightly torqued down on the head gasket 22 for compressing the head gasket 22 sufficiently to form a desired seal between the cylinder head 20 and the cylinder block 12 without imposing any axial force on the liner 14.

A portion 56 of the cylinder head 20 protrudes axially into the cylinder liner bore 58 to define an inboard end surface 59 on the cylinder head 20 which is spaced axially above a recessed end surface 61 on the end extension 40 of the cylinder liner 14 to further accommodate relative tightening movement between the cylinder head 20 and the cylinder block 12 without causing direct contact between the cylinder liner 14 and the cylinder head 20 and thereby prevent the imposition of either an axial force or force moment on the liner 14 which would distort it during engine operation.

In accordance with the invention, combustion gas sealing is dependent upon an active annular sealing element which is in the form of a wire ring 60 positioned radially between the radially inner circumferential surface 46 and the radially inner circumferential surface 44 of the cylinder head 20.

The wire ring 60 fills the gap and imposes a radial force on the end extension at a point where the end extension is fully circumferentially supported by the cylinder head 20. As a consequence, leakage of combustion gases is positively sealed by the wire ring 60 without imposing any significant moments on the cylinder liner 14 which would distort the liner in an undesirable manner.

Figure 4:
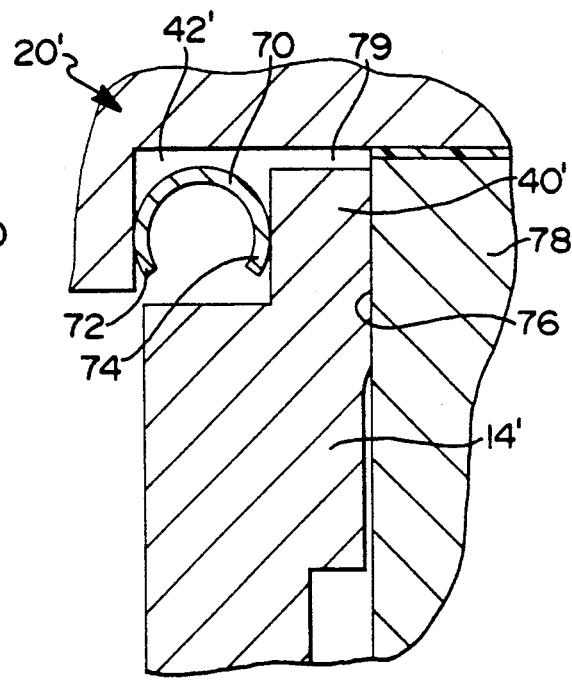
FIGS. 4-6 are enlarged, fragmentary sectional views like FIG. 3 showing further embodiments of the radial combustion gas seal of the present invention.

In the embodiment of FIG. 4, the compliant wire ring 60 is replaced by a C-shaped ring 70 positioned radially between the end extension 40' of a liner 14' and a cylinder head 20'. The end extension 40' is located in a seating and sealing groove 42'. The C-shaped ring 70 receives combustion gases from the combustion chamber to expand the ring edges 72, 74 as shown in FIG. 4 to fill the radial gap and thus seal against combustion gas leakage. In this embodiment the force of the seal ring 70 is reacted against a surface 76 of a block 78 to prevent imposition of a moment on the liner 14'. Axial spacing between liner 14' and the cylinder head 20' is provided at 79 to prevent axial loading on the liner 14' which might distort the liner 14'.

Figure 5:
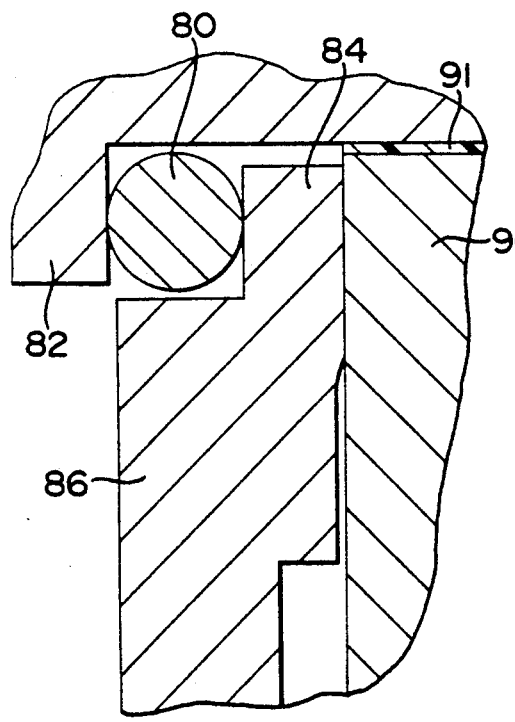

In the embodiment of FIG. 5, a wire ring 80 is located between a cylinder head protrusion 82 which extends into the liner bore in spaced radially inwardly located relationship to the end extension 84 of a cylinder liner 86 that is press fit within the cylinder bore 88 inboard of the outer surface of a cylinder block 90. In this arrangement the cylinder head is torqued against the cylinder block at surface 91 thereon without directing any axial force on the cylinder liner 86. The wire ring 80 radially seals between the protrusion 82 and the block 90 which acts to react the seal loads on the block in a radial direction which imposes only a compressive load on the block. Cast iron engine blocks have high compressive strength for accommodating and withstanding such loads. Furthermore, the reaction of the radial seal force in the cylinder block 90 avoids imposition of liner distorting moments on the cylinder liner 86.

Figure 6:
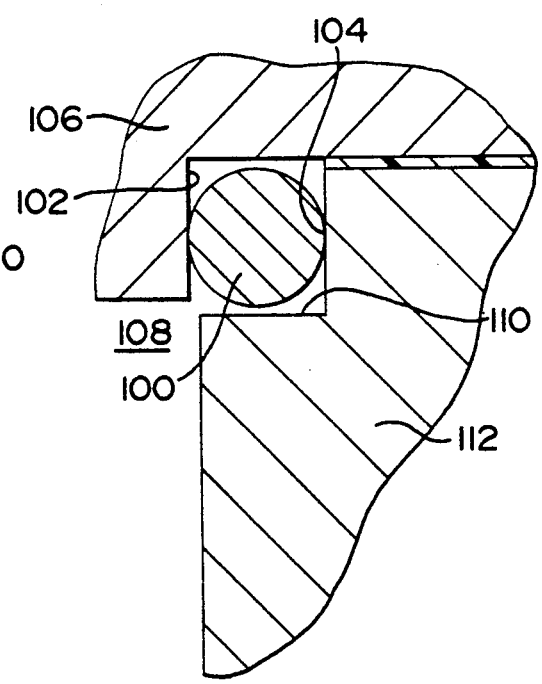

In the embodiment of FIG. 6, a radial combustion seal 100 is illustrated for use in an engine without cylinder liners. In the FIG. 6 embodiment a wire combustion seal is arranged between radially spaced surfaces 102 and 104. The surface 102 is formed on the outer circumference of a cylinder head protrusion 106 extending into the cylinder bore 108. The surface 104 is a circumferential surface formed on a counterbore 110 in the cylinder block 112 of the engine.

In engines without liners the same kind of problems exist in distorting the cylinder walls when the cylinder head is connected to the cylinder block. In the case of such engines the loads and wall distortions are in the cylinder block itself instead of in the cylinder liner. The radial seal of the present invention is equally applicable to engines without liners for solving the wall distortion problem.

EXAMPLE

For a diesel engine a 3000 psi (20,700 kilo Pascals) an end extension is formed with respect to a inner circumferential surface 46 with a 5 degree taper. The nominal sealing load is increased from 31,600 lbs. to 57,722 pounds when subjected to a 3000 psi cylinder pressure due to the 5° taper on the cylinder head groove. The sealing load is accommodated without imposing any axial loading on the liner 14 and is also accomplished while maintaining a moment on the liner extension 40 about the point 40a thereon which is substantially zero. In any case the moment loading because of the 0.0005 inch gap is too small to cause any undesirable distortion in the liner.

While the invention has been described in conjunction with specific embodiments, it is to be understood that many alternatives, modifications and variations will be apparent to those skilled in the art in view of the aforesaid written description. It should further be understood that the designs and embodiments in the aforesaid description may include alternative designs and embodiments as defined by the following claims which constitute the invention scope to which the applicant is entitled.

What is claimed is:

1. A combustion gas seal assembly for sealing combustion gases at the interface of a cylinder liner of a high compression internal combustion engine and the cylinder head comprising:
   a cylinder liner having an end extension with an inner circumferential sealing surface thereon;
   a cylinder head portion extending axially inwardly of the cylinder bore forming a seating and sealing groove having an inner circumferential sealing surface thereon;
   an active combustion gas seal located radially of the inner circumferential surface on the end extension of said cylinder liner and the inner circumferential surface of said annular seating and sealing groove;
   means for supporting the outer circumferential surface of said end extension at a radial clearance dimension between said end extension and said support means; said clearance dimension selected to permit seating of said end extension in said seating and sealing groove while permitting said support means to react against the force of said active combustion gas seal to prevent a loading moment from being imposed thereby onto said cylinder liner which will distort the liner during engine operation; and
   means defining an axial clearance gap between said cylinder head and said cylinder liner for preventing application of axial forces on said cylinder liner during engine operation.

2. The combustion gas seal assembly of claim 1 further characterized by said active combustion gas seal being a wire ring with opposed inner and outer annular surfaces respectively sealingly engaging said inner circumferential sealing surface of the seating and sealing groove and said inner circumferential sealing surface of said end extension.

3. The combustion gas seal assembly of claim 1 further characterized as having a taper on the inner circumferential sealing surface of the seating and sealing groove which will impose a radial sealing force on the active sealing element during assembly of the cylinder head on the cylinder block for sealing a head gasket therebetween.

4. The combustion gas seal assembly of claim 1 further characterized by said active combustion gas seal being a gas energized C-ring having spaced wall portions engaging said inner circumferential sealing surface of the seating and sealing groove and said inner circumferential sealing surface of said end extension to impose a radial sealing force therebetween and wherein said wall portions include an opening therebetween for directing combustion gas between said spaced wall portions to spread said spaced wall portions apart to impose a radial sealing force on said cylinder head and said end extension of said cylinder liner.

5. A seal assembly for sealing combustion gases between a cylinder liner and a cylinder head of an internal combustion engine having a cylinder block, a cylinder liner in a cylinder bore, a cylinder head and a fluid leakage gasket comprising:
   an end extension on said cylinder liner forming a radial load bearing surface and a ring seal support surface;
   a cylinder head portion extending axially inwardly of the cylinder liner bore, said cylinder head portion having an annular seal surface thereon;
   radial seal means forming an active radially directed seal between said ring seal support surface and said annular seal surface to prevent the escape of combustion gases between said cylinder head and said cylinder liner;
   and support means engageable with said radial load bearing surface to react against radial forces imposed by said radial seal means on said end extension to prevent imposition of a moment on said cylinder liner capable of distorting the walls thereof.

6. A seal assembly for sealing combustion gases between a cylinder wall and a cylinder head of an internal combustion engine having a cylinder block, a cylinder bore, a cylinder head and a fluid leakage gasket comprising:

an end extension on said cylinder wall forming a ring seal support surface;

a cylinder head portion extending axially inwardly of the cylinder bore, said cylinder head portion having an annular seal surface thereon;

radial seal means forming an active radially directed seal between said ring seal support surface and said annular seal surface to prevent the escape of combustion gases between said cylinder head and said cylinder wall;

and said cylinder wall reacting against radial forces imposed by said radial seal means on said end extension to prevent imposition of a moment on said cylinder wall capable of distorting said cylinder wall.

7. The seal assembly of claim 5 further characterized in that said support means includes an annular surface on said cylinder block.

8. The seal assembly of claim 5 further characterized by said support means including an annular surface on said cylinder head.

9. The seal assembly of claim 5 further characterized by said radial seal means being a wire ring with opposed inner and outer annular surfaces respectively sealingly engaging said annular sealing surface of said cylinder head portion and said ring seal support surface of said end extension.

10. The seal assembly of claim 5 further characterized as having a taper on said annular sealing surface of said cylinder head portion which will impose a radial sealing force on the radial seal means during assembly of the cylinder head on the cylinder block for sealing a head gasket therebetween.

11. The seal assembly of claim 5 further characterized by said radial seal means being a gas energized C-ring having spaced wall portions engaging said annular sealing surface of said cylinder head portion and said ring seal support surface of said end extension to impose a radial sealing force therebetween and wherein said wall portions include an opening therebetween for directing combustion gas between said spaced wall portions to spread said spaced wall portions apart to impose a radial sealing force on said cylinder head and said end extension of said cylinder liner.

12. The seal assembly of claim 6 further characterized by said radial seal means being a wire ring with opposed inner and outer annular surfaces respectively sealingly engaging said annular sealing surface of said cylinder head portion and said ring seal support surface of said cylinder wall.

13. The seal assembly of claim 6 further characterized as having a taper on said annular sealing surface of said cylinder head portion which will impose a radial sealing force on the radial seal means during assembly of the cylinder head on the cylinder block for sealing a head gasket therebetween.

14. The seal assembly of claim 6 further characterized by said radial seal means being a gas energized C-ring having spaced wall portions engaging said annular sealing surface of said cylinder head portion and said ring seal support surface of said cylinder wall to impose a radial sealing force therebetween and wherein said wall portions include an opening therebetween for directing combustion gas between said spaced wall portions to spread said spaced wall portions apart to impose a radial sealing force on said cylinder head and said ring seal support surface of said cylinder wall.

* * * * *